(No Model.)
G. W., W. T. & J. W. MINOR.
COLTER.
No. 356,490. Patented Jan. 25, 1887.
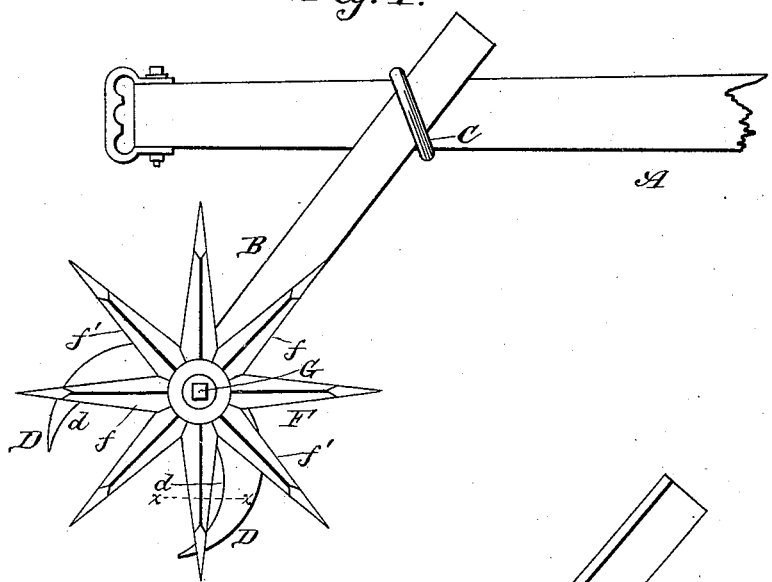
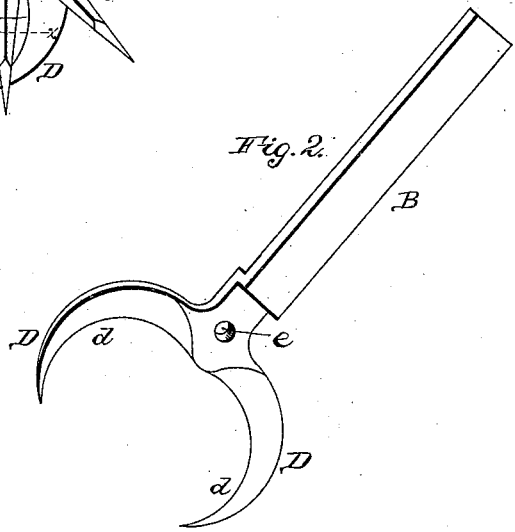
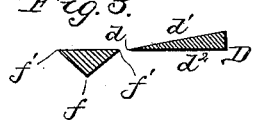
Witnesses
J. W. Garner
R. W. Bishop.
Inventors
Geo. W. Minor,
W<sup>m</sup> T. Minor
and James W. Minor
By their Attorneys
Luther Rees

UNITED STATES PATENT OFFICE.

GEORGE W. MINOR, WILLIAM T. MINOR, AND JAMES W. MINOR, OF EMPORIA, KANSAS.

COLTER.

SPECIFICATION forming part of Letters Patent No. 356,490, dated January 25, 1887.

Application filed May 7, 1886. Serial No. 201,446. (No model.)

*To all whom it may concern:*

Be it known that we, GEORGE W. MINOR, WILLIAM T. MINOR, and JAMES W. MINOR, citizens of the United States, residing at Emporia, in the county of Lyon and State of Kansas, have invented certain new and useful Improvements in Colters; and we do hereby declare the following to be a full, clear, and exact description of the invention, such as will enable others skilled in the art to which it appertains to make and use the same.

Our invention relates to an improvement in colters for plows; and it consists in the peculiar construction and combination of devices, that will be more fully set forth hereinafter, and particularly pointed out in the claims.

In the drawings, Figure 1 is a side elevation of our invention attached to the beam of a plow. Fig. 2 is a perspective view of the colter. Fig. 3 is a transverse sectional view, taken on the line $x\ x$ of Fig. 1.

A represents the plow-beam, and B represents a colter, which is secured to the plow-beam by means of the usual clip, C. The colter extends downwardly and forwardly from the plow-beam, and is provided at its lower end with a pair of curved arms, D, the inner opposing edges of which are sharpened, as at $d$, one side of the curved arms being beveled, as shown at $d'$, Fig. 3, and the other side being flat, as at $d^2$. The outer edges of the curved cutting-arms are thickened to a considerable extent, so as to secure necessary strength and durability. In that portion of the shank of the colter between the inner ends of the curved cutting-arms is made a transverse opening, $e$.

F represents a walking-wheel, which is provided with a number of radial arms, $f$, which are flat or plane on one side, and have the other side beveled from the center to the outer edges, as at $f'$, thereby forming two sharpened cutting-edges to each arm. This wheel is pivoted to the colter by means of a bolt, G, which passes through the central opening in the wheel and through the opening $e$. The flat side of the wheel bears against the flat side of the colter, so that when the wheel revolves the cutting-edges thereof move past the cutting-edges of the colter, thereby making a shear cut.

Owing to the inclination of the colter when it is attached to the plow-beam, it will be understood that only one of its curved arms runs in the ground in advance of the plowshare, the other curved arm of the colter being supported at a distance above the ground, as shown.

As the plow is drawn along the points of the radial arms of the walking-wheel engage with the ground, thereby rotating the wheel and causing the trash and sod to be cut in advance of the plowshare.

By providing the colter with the two extending curved arms sharpened on their inner edges the colter is rendered reversible, and is adapted to be turned and secured to the plow-beam so as to cause either of the cutting-arms to run in the soil, and thus adapt the colter to be used on either a right or left hand plow.

We are aware that sickle-shaped colters have been before the public and combined with walking-wheels; but such colters could only be used or operated on one side of a plow-beam, while our invention is reversible, and, in consequence, of far more utility and benefit to those who manipulate the plow in farming.

Having thus described our invention, we claim—

1. The colter having the curved arms D, flat on one side and having the other side beveled to form cutting-edges on the opposing inner sides of the arms, in combination with the walking-wheel pivoted to the colter on the flat side thereof, the opposing side of the wheel being also flat, and the said wheel having the radial straight arms provided each with the double cutting-edges, whereby the said colter is rendered reversible, substantially as described.

2. In a colter adapted to use on either a right or left hand plow, the combination of the double opposed bevel-edged cutting-arms, with a walking-wheel pivoted to said colter on the flat side of said arms and having its radial arms provided with double cutting-edges.

In testimony whereof we have affixed our signatures in presence of two witnesses.

GEORGE W. MINOR.
WILLIAM T. MINOR.
JAMES W. MINOR.

Witnesses:
JOHN W. LEWIS,
LEVI EVANS.